(No Model.)
J. G. JOHNSON.
FRUIT SEEDER.
No. 579,985. Patented Apr. 6, 1897.
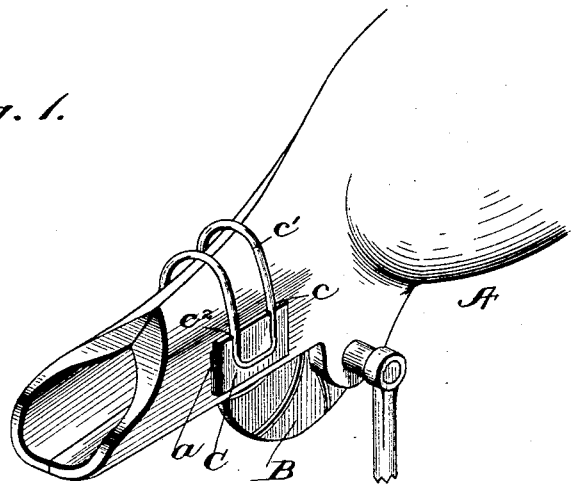
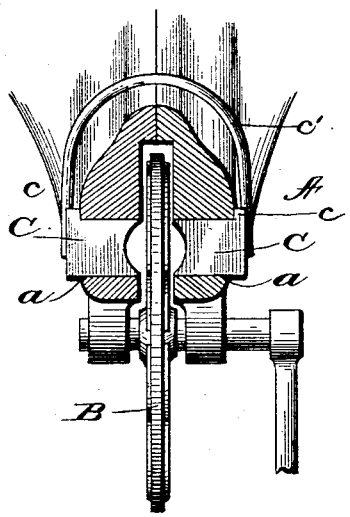
WITNESSES
INVENTOR
John G. Johnson,
by John Wedderburn
Attorney

UNITED STATES PATENT OFFICE.

JOHN G. JOHNSON, OF GORDON, PENNSYLVANIA.

FRUIT-SEEDER.

SPECIFICATION forming part of Letters Patent No. 579,985, dated April 6, 1897.

Application filed October 1, 1896. Serial No. 607,567. (No model.)

*To all whom it may concern:*

Be it known that I, JOHN G. JOHNSON, a citizen of the United States, residing at Gordon, in the county of Schuylkill and State of Pennsylvania, have invented certain new and useful Improvements in Fruit-Seeders; and I do hereby declare the following to be a full, clear, and exact description of the invention, such as will enable others skilled in the art to which it appertains to make and use the same.

My invention relates to an improvement in machines for seeding fruit, &c., the form here shown being particularly adapted for use in seeding cherries, although it will be understood that the device is not limited to use with this particular kind of fruit.

My object is to provide a construction in which the throat of the seeder at the sides of the wheel is adjustable automatically in order to accommodate stones of various sizes.

To this end the invention consists in the various matters hereinafter described and claimed.

In the accompanying drawings, which illustrate the invention, Figure 1 is a perspective of so much of a cherry-seeder as is necessary, showing my improvement applied. Fig. 2 is a front elevation, partly in section, taken just in front of the side pieces inserted in the throat; and Fig. 3 is a detail of one of these side pieces.

Referring now more particularly to the drawings, A represents the throat of a cherry-seeder, and B the wheel for separating the stones from the fruit. In the throat at the sides of the wheel are provided recesses or slots $a$, into which fit plates C, these plates having their inner sides formed as a continuation of the interior of the throat in its fixed portion. The outer side of each of these plates C is provided with a flange or projection $c$, here shown as extending along its top, said flange or projection limiting the inward movement of the plates. These plates are spring-pressed inwardly, so that they normally lie in their innermost position, but being spring-pressed should any seed of unusual size come between the plate and the wheel the plate will yield outwardly to permit the passage of the stones. Of course various means may be provided for giving this inward spring-pressure, but I have here shown a yoke of spring metal $c'$, which extends over the neck of the seeder and has its ends lying in grooves $c^2$ in the plates C. It will thus be seen that by reason of employing these spring-pressed plates as sections of the throat at the sides of the wheel the throat at this point readily adapts itself to various sizes of stones, thus effectually preventing clogging or breaking of the parts. The members are easily made and assembled and can be readily detached for repair or cleaning.

Having thus described my invention, what I claim as new, and desire to secure by Letters Patent, is—

1. In a machine for seeding fruit and the like, a throat, slots in opposite sides of said throat, movable plates fitting within said slots and having their inner faces formed to form a section of the throat, and means for holding said plates yieldingly within said slots, substantially as described.

2. In a machine for seeding fruit and the like, a throat, a member for seeding the fruit working in said throat, the throat being provided with slots at the sides of the seeding member, plates fitting in said slots, the inner faces of said plates forming a section of the throat, and means for yieldingly pressing said plates inwardly, substantially as described.

3. In a machine for seeding fruit and the like, a throat, a member for seeding the fruit operating in said throat, said throat being provided at the sides of the seeding member with slots, plates movably fitting in said slots, the inner faces of said plates forming a section of the throat, means for yieldingly pressing said plates inwardly, and a projection upon said plates adapted to bear against the machine at the edge of a slot and limit the inward movement of the plates, substantially as described.

In testimony whereof I have signed this specification in the presence of two subscribing witnesses.

JOHN G. JOHNSON.

Witnesses:
R. D. HEATON,
LAFAYETTE WOLFGANG.